(12) United States Patent
Eckelt et al.

(10) Patent No.: US 7,913,464 B2
(45) Date of Patent: Mar. 29, 2011

(54) DEVICE FOR ASSEMBLING LAMINATED GLASS PANES

(75) Inventors: Christian Eckelt, Steyr (AT); Roland Leopoldseder, St Valentin (AT)

(73) Assignee: Saint-Gobain Glass France, Courbevoie (FR)

( * ) Notice: Subject to any disclaimer, the term of this patent is extended or adjusted under 35 U.S.C. 154(b) by 801 days.

(21) Appl. No.: 10/587,168

(22) PCT Filed: Jan. 25, 2005

(86) PCT No.: PCT/FR2005/050042
§ 371 (c)(1),
(2), (4) Date: Jul. 25, 2006

(87) PCT Pub. No.: WO2005/075780
PCT Pub. Date: Aug. 18, 2005

(65) Prior Publication Data
US 2007/0125014 A1    Jun. 7, 2007

(30) Foreign Application Priority Data

Jan. 27, 2004    (DE) .......................... 10 2004 003 960

(51) Int. Cl.
| | |
|---|---|
| *E06B 7/00* | (2006.01) |
| *E06B 3/30* | (2006.01) |
| *E06B 9/01* | (2006.01) |
| *E06B 3/988* | (2006.01) |
| *E04B 9/00* | (2006.01) |
| *E04B 2/00* | (2006.01) |
| *E04C 3/00* | (2006.01) |
| *E04C 2/54* | (2006.01) |
| *E04C 2/00* | (2006.01) |

(52) U.S. Cl. ............ 52/204.62; 52/204.591; 52/204.593; 52/204.597; 52/204.54; 52/204.6; 52/204.71; 52/478; 52/462; 52/591.4; 52/591.5; 52/786.1; 52/796.1

(58) Field of Classification Search ............. 52/204.591, 52/204.593, 204.597, 235, 582.1, 582.2, 52/204.62–204.65, 540, 478, 409, 204.54, 52/204.57, 204.6, 79.2, 204.71, 394, 430, 52/462, 591.4, 591.5, 786.1, 796.1; 428/47, 428/49

See application file for complete search history.

(56) References Cited

U.S. PATENT DOCUMENTS 2,256,104 A * 9/1941 Ringle ............................ 52/394
2,338,870 A * 1/1944 Praeger ........................ 52/582.1
(Continued)

FOREIGN PATENT DOCUMENTS

DE    198 16 099    10/1999
(Continued)

*Primary Examiner* — Brian E Glessner
*Assistant Examiner* — Omar Hijaz
(74) *Attorney, Agent, or Firm* — Oblon, Spivak, McClelland, Maier & Neustadt, L.L.P.

(57) ABSTRACT

An assembly device for at least two laminated glazing elements each including plural individual glazing elements that are rigid and assembled to one another at the surface by bonding layers, which succeed one another in a direction of extension, partially overlapping in contiguous edge regions in perpendicular projection on faces of the glazing elements, and are assembled to one another in this limited overlap region on the edge side. Only one portion of the rigid glazing elements, at least one individual glazing element of each laminated glazing element, extends into the overlap region. This allows a smooth continuous transition from one laminated glazing element to the next with a visual effect of an extremely transparent glazing.

21 Claims, 2 Drawing Sheets

U.S. PATENT DOCUMENTS

| | | | | |
|---|---|---|---|---|
| 3,765,140 | A * | 10/1973 | Harry | 52/409 |
| 5,326,606 | A * | 7/1994 | Labock | 428/49 |
| 5,802,793 | A * | 9/1998 | DeVore, Jr. | 52/424 |
| 6,138,434 | A * | 10/2000 | Demars et al. | 52/786.13 |
| 6,280,826 | B1 * | 8/2001 | Woll et al. | 428/192 |
| 6,430,894 | B1 * | 8/2002 | Chae et al. | 52/786.1 |
| 6,623,203 | B2 * | 9/2003 | Kreyenborg et al. | 403/374.3 |
| 6,796,091 | B2 * | 9/2004 | Elmer | 52/235 |
| 7,155,869 | B2 * | 1/2007 | Wildenhain et al. | 52/506.05 |
| 2003/0138307 | A1 * | 7/2003 | Lind | 411/34 |
| 2004/0055697 | A1 * | 3/2004 | Eckelt et al. | 156/272.2 |
| 2008/0005983 | A1 * | 1/2008 | Lin | 52/235 |

FOREIGN PATENT DOCUMENTS

DE  10063547 C1 * 5/2002

* cited by examiner

DEVICE FOR ASSEMBLING LAMINATED GLASS PANES

CROSS-REFERENCED RELATED APPLICATIONS

The present application is the U.S. counterpart of WO 2005/075780 and claims priority to German application No. 102004003960.7 filed on Jan. 27, 2004, the entire contents of each of which are hereby incorporated herein by reference.

BACKGROUND OF THE INVENTION

I. Field of the Invention

The invention relates to an assembly device for laminated glazing elements, comprising at least two laminated glazing elements each consisting of several individual glazing elements which are rigid and assembled to one another at the surface by means of bonding layers, which succeed one another in a direction of extension, partially overlapping in contiguous edge regions in perpendicular projection on the faces of the glazing elements, and are assembled to one another in this limited overlap region on the edge side.

II. Discussion of the Background

Document DE-A1-198 16 099 describes an assembly device of this kind, in particular for laminated glazing elements, in which, according to one embodiment, two laminated glazing elements placed parallel and at a distance from one another enclose between them with an overlap, close to their rims, a third laminated glazing element. In the region of the overlap, the three laminated glazing elements are assembled with the aid of a bolt, which passes through the three laminated glazing elements. The corresponding holes in the three laminated glazing elements do not necessarily have to be axially aligned because, according to this known solution, a mass of curable sealant which coats said bolt may totally compensate for the tolerances on the positions of the holes. After it has cured, this mass of sealant withstands the forces exerted on the walls of the holes. This assembly device is provided in particular for what is known as the glass stringer assembly, that is to say the assembly of elongated reinforcement elements consisting of several glass beams of composite structure, mainly in glazed facades.

It is also known practice to cause to protrude, on the edge side, outside the glass composite, assembly elements for edge-to-edge assemblies of laminated glazing elements. Thus, document DE-C 1 203 924 describes a laminated safety glass consisting of two rigid glass glazing elements and of a layer of adhesive that assembles them to one another. The edge of one of the two rigid glazing elements markedly protrudes beyond the edge of the other glazing element. The layer of adhesive ends with a recess in front of the edge of the smaller rigid glazing element. The gap that remains is filled with a mass of sealant made of a silicone elastomer, which again protrudes in the form of an elongated rim beyond the protrusion of the larger rigid glazing element and which may contain a metal brace. It is used to attach the laminated glazing element to a frame or similar without drilling into the rigid glazing elements (of glass) themselves. This assembly device was devised mainly for the assembly of laminated glazing elements in airplanes.

In another assembly device for laminated glazing elements (DE-C1-199 58 372), the (central) glazing elements, each time internal, consist, in the edge regions of laminated glazing elements, of at least three rigid glazing elements, shorter than the external glazing elements. A rigid retention element, for example a steel plate, whose thickness corresponds to the thickness of said central glazing element is inserted into the gap that remains. It is thus possible to incorporate this retention element into the composite during the assembly process (autoclave or similar method). As an assembly element, use can be made for this purpose of the thermoplastic adhesive films used in any case between the rigid glazing elements. These laminated glazing elements may be attached to a framework without holes in the rigid glazing elements with the aid of the protruding retention element.

Besides the solution mentioned in the introduction to compensate for the tolerances of the walls of the holes when attaching bolts or sleeves in the holes passing through the multilayer composite glazing elements (each time with two external glazing elements and at least one central glazing element), yet other solutions are known from documents DE 100 55 983 C1 and DE 100 63 547 C1. Both relate to a positioning of sleeves with eccentric sleeves, for which, in the first document, the hole in the central glazing element is smaller than the holes in the external glazing elements, while in the second solution the hole in the central glazing element is larger than that in the external glazing elements.

SUMMARY OF THE INVENTION

The problem on which the invention is based is to procure another assembly device for laminated glazing elements, which is used to assemble the latter to one another in smooth axial alignment (for one and the same thickness).

According to the invention, this problem is solved by the fact that only a portion of the rigid glazing elements, at least one individual glazing element of each laminated glazing element, extends into the overlap region.

The features of the dependent claims exhibit advantageous embodiments of this invention.

The advantage that conforms to the problem and to the invention results from the fact that the laminated glazing elements are staggered at the edge in the overlap region, or that in each case the individual glazing elements of the respective composite do not all extend up to this edge. Because only a portion of the rigid glazing elements of each laminated glazing element extends into the overlap region, where the assembly between the laminated glazing elements is carried out, it is possible to produce smooth transitions of the external faces of the successive assembled glazing elements in a direction of extension, and on which only the local attachment elements protrude where necessary. In particular it is possible to dispense with metal fastening lugs placed on the outside or similar, which are in the contrary case inevitable in edge-to-edge assemblies of two glazing elements (of glass). "Direction of extension" here means the laminated glazing element extension oriented over the assembly joint.

The nature of the assembly of the glazing elements partially overlapping one another may be chosen according to the needs and possibilities of installation on the site. Preferably assemblies with bolts of the type already known according to the prior art (with through-holes) will be used as the assembly member, in order also to mechanically attach the laminated glazing elements together, an advantageous embodiment according to the invention again being discussed for this purpose.

It is however also possible to work with gripper assemblies situated on the outside, which only clamp the glazing elements together in the overlap region, with which it is preferable to provide intermediate elastic layers between the glass surfaces.

Finally, thought may be given to assembling the glazing elements in the overlap region by surface bonding, by inserting a mass of highly adhesive sealant, that can cure or remains permanently elastic, in the slot/the interstice between the individual glazing elements. Where appropriate, the bond may be improved with a primer, with which the glass faces facing one another are coated. Such solutions may be carried out transparently and procure the impression of a single continuous glass strip.

It goes without saying that the aforementioned assembly possibilities and other assembly options not mentioned explicitly here may be freely combined with one another as required.

It is in principle possible to allow only the individual (monolithic) rigid glazing elements to protrude beyond the laminated glazing elements in the overlap region to assemble one to the other according to the invention, for example two laminated glazing elements each consisting of two rigid glazing elements (of glass). In this case, the two glazing elements will be made to overlap partially at least like prestressed glass glazing elements, in order to achieve the necessary mechanical strength.

If the laminated glazing elements each consist of at least three individual glazing elements, the assembly can be achieved according to the invention by allowing only one external glazing element of a first glazing element to project beyond the edges of the other two glazing elements, while the external glazing element corresponding to the glazing element to be assembled is recessed in a corresponding measure relative to the other two glazing elements.

According to a variant, the central glazing element of a triple composite may be recessed and the associated glazing element may be furnished with a central glazing element which projects. As a result, the two composite glazing elements are assembled virtually by indentation or by mortise and tenon in the overlap region.

All the aforementioned configurations can be achieved in a similar manner with laminated glazing elements which comprise more than three rigid glazing elements, in which the "individual glazing elements" which project may then themselves again form portions of laminated glazing elements. This constitutes a preferred embodiment of the present invention, which is described as an example with the aid of the figures.

Other possibilities are not however excluded from the field of the concept of the invention, because they are included in the claims. Here also, it would for example be possible to provide an indentation of the individual glazing elements in the overlap region, by causing one projecting glazing element and one recessed glazing element to succeed one another in alternation.

It goes without saying that any slots or any intermediate spaces between the overlapping individual or laminated glazing elements must always be filled with appropriate (preferably transparent) materials, such that the latter must not take excessive internal static bending stresses under the action of clamping or gripping forces from the assembly elements.

If ironwork elements are used in holes of the mutually overlapping regions of the laminated glazing elements, the latter may in an optimal case be inserted flush with the surface, or project only slightly above the external faces of the glazing elements. Lugs or rails placed on the outside, plainly visible, may on the other hand, as has already been indicated, be completely eliminated with the solution according to the invention, so that a visually transparent "pure glazing" effect can be obtained.

An alignment compensation between the holes in the laminated glazing elements to be assembled may be limited, according to the invention, to two individual glazing elements, one of each laminated glazing element, even though the latter are in their turn components of portions of laminated glazing elements that overlap. According to one advantageous embodiment, this is obtained in that an assembly member passing through the laminated glazing elements in the overlap region is centered on the axis of a hole in a first individual glazing element, while any divergences from the center of the hole of a second individual glazing element belonging to the other laminated glazing element are compensated for with appropriate means (for example eccentric rings according to document EP 506 522 B1). In this instance it is worthwhile to cause the assembly member to press radially on the walls of at least two holes belonging to the various laminated glazing elements, so that the external loads can be transmitted reliably and without damage between the two glazing elements.

BRIEF DESCRIPTION OF THE DRAWINGS

Other details and advantages of the subject of the invention will appear through the drawings of an exemplary embodiment and through their detailed description that follows.

In these simplified drawings, with no particular scale.

DETAILED DESCRIPTION OF THE INVENTION

Figure 1:
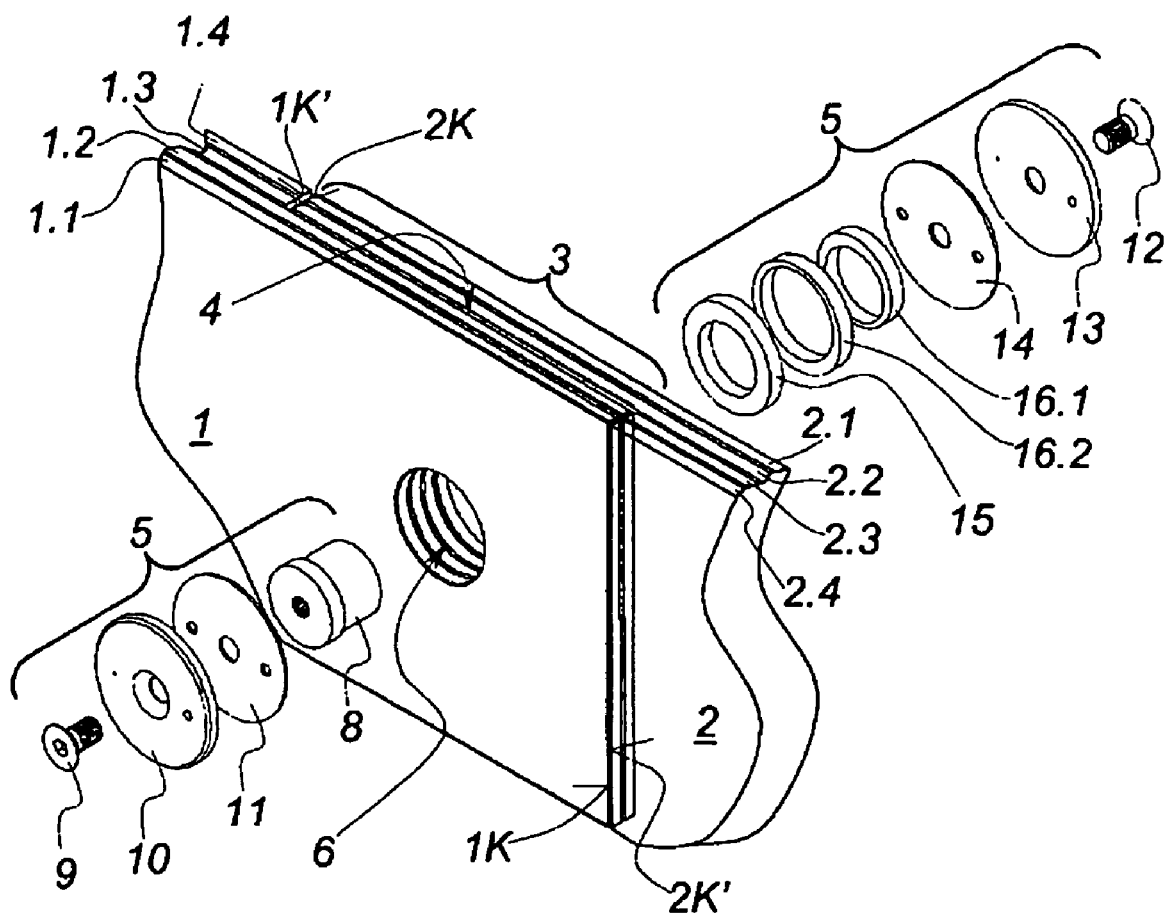
FIG. 1 is a view in perspective of an overlap region of two laminated glazing elements to be assembled with an assembly device according to the invention, with an exploded representation of a corresponding assembly member.

FIG. 1 shows the portions of two laminated glazing elements 1 and 2 that each consist of four rigid glazing elements 1.1, 1.2, 1.3, 1.4 and 2.1, 2.2, 2.3, 2.4 and that are contiguous with one another edge to edge via straight rims. The individual glazing elements, 1.1 to 1.4 and 2.1 to 2.4 are assembled to one another permanently at the surface in conventional manner with the aid of intermediate thermoplastic adhesive films (PVB). For the description that follows, it is assumed that the individual glazing elements are made of glass. The application of the assembly device described here for glass-plastic composites or laminated glazing elements made totally of plastic is not however ruled out for all that.

The individual glass glazing elements may consist of normal float glass; they may be prestressed or partially prestressed.

It can be seen on the top rims of the laminated glazing elements that the individual glazing elements 1.1 and 1.2 and 2.1 and 2.2 extend beyond the edges of the respectively associated individual glazing elements 1.3 and 1.4 and 2.3 and 2.4. The edge-to-edge rims already mentioned are identified as 1K and 2K on the external rims (at the same time transverse faces of the glazing elements 1.1 and 1.2 and 2.1 and 2.2) and 1K' and 2K' for the recessed staggered rims (transverse faces of the glazing elements 1.3 and 1.4 and 2.3 and 2.4). It is in particular preferable to dimension the respective partial protrusions of the two laminated glazing elements in exactly equal manner, so that no major gaps appear in their external faces after assembly.

These edge-to-edge rims delimit between them an overlap region 3. Here, partial faces of the glazing elements 1.2 and 2.2 face one another. In the overlap region 3, a gap 4 forms between them. Into the latter, an intermediate layer (see FIG. 2) is inserted that should have the same thickness as the bonding layer which assembles said two glazing elements each time with the contiguous glazing elements 1.3 respectively 2.3. This ensures on the one hand that the two outer faces of the laminated glazing elements 1 and 2 are in smooth alignment with one another, when they are oriented parallel with one another. On the other hand, the faces facing one another of the two individual glass glazing elements are not applied directly to one another. In addition, the relatively soft intermediate layer may allow minor disparities relative to the parallel longitudinal alignment of the two laminated glazing elements and in limited manner also dynamic deformations due to the pressures and turning moments that act from the outside.

Although the intermediate layer mentioned in the gap 4 could in principle assemble the two laminated glazing elements to one another in bonding manner at the surface, if it were in the form of a strongly adherent adhesive, provision is made, in the overlap region 3, according to one advantageous embodiment of the invention, for at least one assembly member or multi-part mechanical retention member, all of whose elements are provided in FIG. 1 with reference number 5 either side of the overlap region 3. The individual reference numbers of the elements will be introduced during the description of FIG. 2.

Naturally, where necessary, several assembly members may be provided in the overlap region, if the load conditions require and if the construction space or the surface of the overlap region have been designed to be sufficiently large.

The individual glazing elements 1.1, 1.2, 2.2 and 2.1 are for this purpose all traversed in the overlap region. Their at least approximately axially aligned holes together provide a through-hole 6 situated in the center of the overlap region, which may however have staggered walls due to production tolerances (differences of position/of measurements) of the individual holes. As has also already been described in the prior art mentioned in the introduction, this problem often arises with such assembly structures, because the holes may be brought into exact axial position one above the other at no small cost when the individual glazing elements are drilled and during the assembly process. However, the nominal diameters of the holes themselves may in any case be reproduced with a sufficiently great precision, so that the adjustment pieces may be reserved for filling them.

Figure 2:
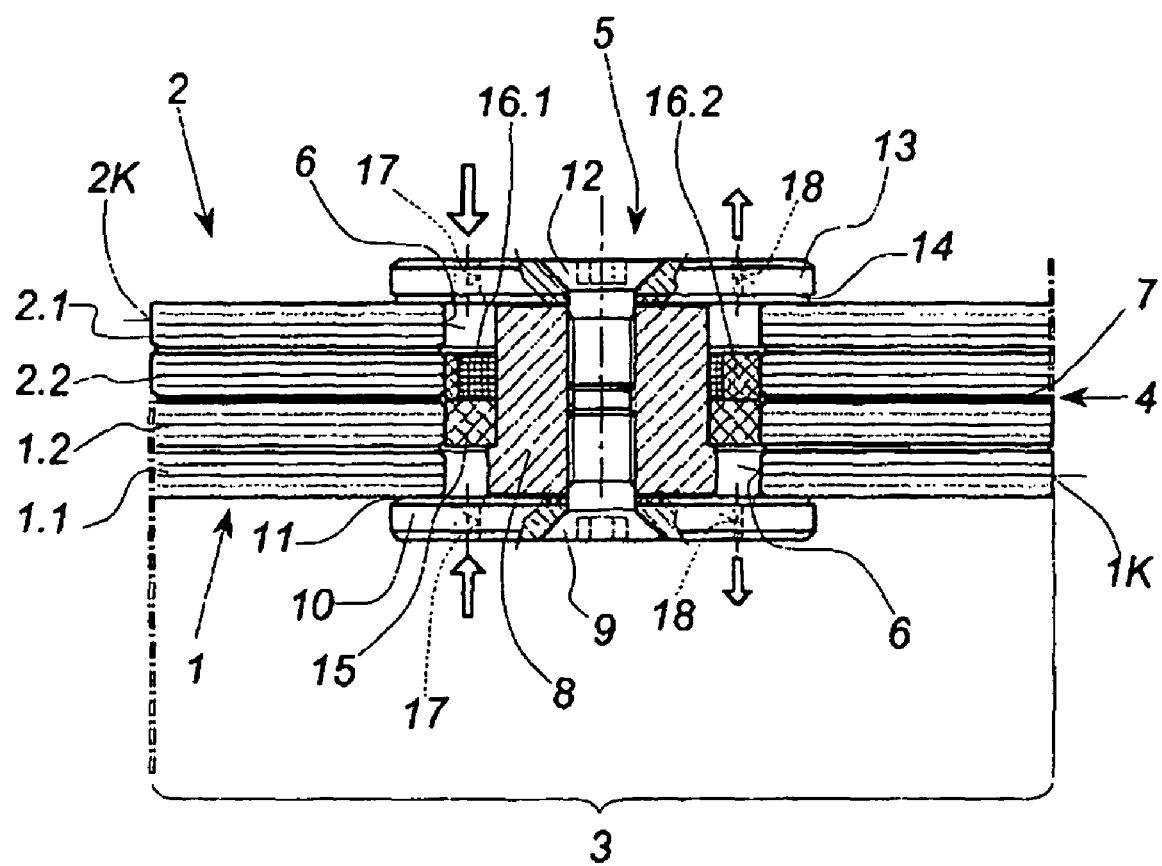
FIG. 2 shows a representation in section of the assembly device according to FIG. 1 in the overlap region.

With the aid of the representation in section of FIG. 2, the components of the assembly member 5 (already assembled) and their functions will now be explained in detail. Pieces identical to those in FIG. 1 are again provided with the same reference numbers. The observer is looking down on the view of FIG. 1, the section runs through the axial horizontal plane of the through-hole 6. Only the portions of the two laminated glazing elements 1 and 2 which mutually overlap (across the spread of the brace 3) are all that can be seen, in addition to the rims 1K and 2K. The previously mentioned intermediate layer 7 placed in the gap 4 between the glazing elements 1.2 and 2.2 can also be recognized.

The central piece of this assembly member is a sleeve 8 made of metal or of a strong plastic, whose length corresponds substantially to the total thickness of the laminated glazing elements 1 and 2, but whose external diameter is markedly smaller than the diameter of the through-hole 6. The externally staggered cylindrical sleeve 8 is provided with a continuous internal fillet (a plastic sleeve will be provided with a filleted metal insert). Headed screws 9 and 12 are screwed from both sides, each of these headed screws made in the form of hexagonal socket screws being inserted through an end washer 10, respectively 13, which masks the hole 6 from the outside. Between the end washers 10 and 13 and the annular glass surface covered respectively by the latter, plastic shims 11 respectively 14 are inserted that prevent direct contact between the washers (metal) 10 and 13 and the rims and the faces of the glass.

It is certainly advantageous, for most loading situations, that the end washers have a large bearing base on the outer surface on which they bear, as is shown here. At the same time, a sliding transverse compensation on the outer surfaces relative to relative differences of the centers of the holes of the individual glazing elements is thus possible.

However, consideration could also be given to making the end washers with a frustoconical contour and pushing them at least partially into corresponding conical holes in the outer glazing elements 1.1 respectively 2.1. This—unlike the illustration—would provide a completely or approximately smooth surface even in the region of the assembly member 5. This may, where necessary, be reinforced with the intermediate layer 7 being produced in the form of a layer of adhesive. However, this configuration can be achieved intentionally only if at least the two holes in the outer glazing elements can be positioned axially with a great precision.

The assembly member 5 is pressed radially into the wall of the through-hole 6 by means of adjustment elements for the transmission of forces onto the wall. In the configuration shown, the latter consist of a centering ring 15—preferably made of plastic—whose internal diameter matches the external diameter of the sleeve 8 and whose external diameter matches the internal diameter of the hole of the individual glazing element 1.2. The centering ring 15 rests on an annular shoulder of the sleeve 8. Its distance from the end washer 10 in the longitudinal direction of the sleeve 8 is dimensioned so that the centering ring 15 is situated as precisely as possible in the hole of the individual glazing element 1.2 after the insertion of the sleeve 8, as soon as the end washer 10, respectively its plastic shim 11, is applied to the outer surface of the glass glazing element.

The centering ring 15 determines the centering of the assembly member 5 in the through-hole 6 and then also the position of the end washers 10 and 14 relative to the center of the hole in the outer face. For the compensation of any differences of position of the axis of the hole in the individual glazing element 2.2 relative to the axis of the hole in the individual glazing element 1.2, the sleeve is held radially in the latter by a combination of two eccentric rings 16.1 and 16.2 known per se in a similar context (EP 506 522 B1), which may be applied directly to the centering ring 15 in the axial direction. The internal diameter of the internal eccentric ring 16.1 is equal to the external diameter of the sleeve 8, while the external diameter of the external eccentric ring 16.2 is equal to the internal diameter of the hole of the individual glazing element 2.2. Likewise, the eccentric rings 16.1 and 16.2 are, like the centering ring 15, preferably made of high-strength, aging-resistant plastic.

It can be seen that two holes 17 and 18 of different size (drawn with dashed lines) are provided each time in the end washers 10 and 13. On each occasion, the larger hole 17, as is indicated by the arrows toward the holes, is used to insert a mass of filler into the hollow spaces that remain in the hole after the assembly member 5 has been installed, while the smaller respective hole 18 not only allows the displaced air to escape (arrows outward) but serves as a control outlet for the mass of filler after the latter has completely filled or in any case as much as possible filled said hollow spaces.

For the installation of the assembly member, provision is made for the sleeve 8 with the end washer 10 and the shim 11 to be grouped into a single unit by means of the headed screw 9. To reduce the number of pieces, the sleeve could also be combined into a single piece with the end washer 10 (then where necessary without screw 9). The centering ring 15 is engaged in the sleeve 8 as far as the shoulder and held in position thereon. The unit with the engaged centering ring 15 is inserted into the hole through the outer face of the laminated glazing element 1. By a precise adaptation to the internal diameter of the hole in the glazing element 1.2, the centering ring 15 is positioned exactly in the center of the hole. It may take, respectively transmit, the forces acting on this wall of the hole. A lightly tightened adjustment, or also an adhesive coating of the outer periphery of the centering ring may help installation, while preventing the latter from falling out of the preassembled unit.

Before the laminated glazing element 2 is installed in the overlap region 3 onto the laminated glazing element 1, the transparent intermediate layer 7 is inserted. It has a recess matching the size of the through-hole.

The internal eccentric ring 16.1 is slid into any position on the sleeve 8 until it presses on the centering ring 15. After the laminated glazing element 2 has been installed, the external eccentric ring 16.2 is inserted into the position shown, in which, on the one hand, it surrounds the internal eccentric ring 16.1 and, on the other hand, it presses externally on the lateral surface of the hole of the individual glazing element 2.2. To compensate for the differences in the centers of the holes, the two eccentric rings 16.1 and 16.2 may rotate relative to one another. In total, this gives a positional fixing in the hole of the individual glazing element 2.2, in addition to compensating for the tolerances. It can be seen that only the two inner individual glazing elements 1.2 and 2.2 of the laminated glazing elements 1 and 2 are involved in the centering and in the transfer of load in the wall of the through-hole.

Unlike this representation, it would also be possible to provide an equivalent centering with the aid of the holes in the outer individual glazing elements 1.1 and 2.1. Since the individual glazing elements of each laminated glazing element are assembled to one another in a shear-resistant manner by the adhesive layers, a (radial) load transfer in only one of the two glazing elements, as is shown here, fully satisfies the requirements.

For the final firm assembly of the laminated glazing elements 1 and 2, the screw 12 is now screwed into the sleeve 8 with the end washer 13 and the intermediate layer 14, to close the hole 6. It is advantageous that, disregarding a precise estimate of the tightening torque provided for tightening the screw 12, the axial length of the sleeve 8 is adapted to the total thickness of the overlap region 3, so that the sleeve forms a security stop against overtightening the screws and overflattening the end washers on the outer surfaces, in order to be able to prevent damage to the laminated glazing elements.

The residual hollow spaces of the through-hole 6 are filled with an appropriate mass of filler (multi-component cement mortar, molding resin, etc.). In this instance, the mass of filler is injected under pressure through the larger hole 17 provided in the end washers 10 respectively 14, until it comes out of the smaller outlet orifices 18. After the mass of filler has cured, a uniform application or transmission of the forces in the wall of the hole is guaranteed. At the same time, the assembly member 5 is fully coated in the through-hole 6. The intermediate (transparent) layer 7 prevents the filler mass from penetrating into the gap between the glazing elements 1.2 and 2.2 in the overlap region.

It will be remembered that several holes 6 and several assembly members 5 of this type may be provided in one and the same overlap region 3, when the stresses encountered so require. In the preferred application of the assembly device for the installation of stringers or strips of glass, that are provided to reinforce fully glazed facades, the construction module (long and slender in the manner of a beam) consisting of at least two successive laminated glazing elements (which in their turn may consist of two, three or even more assembled individual glazing elements) is installed with a longitudinal rim on the face of the facade or is assembled to the latter.

The external faces of the laminated glazing elements are thus inclined relative to the surface of the facade, which in its turn consists of a plurality of glass glazing elements fixed to a framework while being situated in the plane of the surface of the facade. External forces (for example bending of the facade under the force of the wind) consequently introduce into the module transverse bending forces which are where appropriate better accommodated and transmitted with several assembly devices placed one beside the other. The main load in this instance acts as in shear on the assembly members provided in the overlap region. In this instance, the latter may be placed in line or at the corners of a polygon.

Each individual beam made of laminated glazing elements has a maximum length of approximately 6 m, taking into account the usual maximum length of the semi-manufactured products. Consequently it goes without saying that said modules may also extend to several edge-to-edge assemblies with assembly devices according to the invention, if the facade extends for example over several floors.

The total length of the overlap region in the direction of extension of the laminated glazing elements will, just like the width of the laminated glazing elements themselves, be dimensioned according to the load in question and, where appropriate, according to the number of through-holes and assembly members to be placed per overlap region. For example, this zone of overlap may extend to 2 meters.

The invention claimed is:

1. An assembly device, comprising:
   two laminated glazing elements each including a plurality of individual glazing elements, the individual glazing elements being rigid and assembled to one another at a surface by intermediate bonding layers,
   wherein the two laminated glazing elements succeed one another in a direction of extension such that the individual glazing elements of a first of the two laminated glazing elements are contiguous with the individual glazing elements of a second of the two laminated glazing elements, and partially overlap in an overlap region,
   wherein only part of, and at least one of, the individual glazing elements of each of the two laminated glazing elements extends into the overlap region so that a through-hole passes through each of the laminated glazing elements in the overlap region,
   wherein the two laminated glazing elements are assembled to one another in the overlap region by another bonding layer provided between said laminated glazing elements in the overlap region and a mechanical retention member inserted in the through-hole in the overlap region.

2. The assembly device as claimed in claim 1, wherein a thickness of the overlap region, which is equal to the sum of thicknesses of the individual glazing elements extending into the overlap region plus a thickness of the intermediate bonding layers and the bonding layer between said laminated glazing elements, does not exceed a thickness of one of the laminated glazing elements.

3. The assembly device as claimed in claim 1, wherein an edge side of each of the laminated glazing elements includes rims that are offset relative to one another in the direction of extension, wherein the rims of the first of the laminated glazing elements are intended to be contiguous edge to edge with the rims of the second of the laminated glazing elements.

4. The assembly device as claimed in claim 1, wherein an edge side of each of the laminated glazing elements includes at least one projecting rim formed by at least one individual glazing element which protrudes and at least one recessed rim formed by at least one individual glazing element which is recessed.

5. The assembly device as claimed in claim 4, wherein the at least one projecting rim is formed by several individual glazing elements which are assembled to one another and the at least one recessed rim is formed by several individual glazing elements which are assembled to one another.

6. The assembly device as claimed in claim 4, wherein, in the direction of extension, the at least one projecting rim of the first of the laminated glazing elements follows the at least one recessed rim of the second of the laminated glazing elements.

7. The assembly device as claimed in claim 4, wherein two rims offset relative to one another form a staggered formation on the edge side of each of the laminated glazing elements.

8. The assembly device as claimed in claim 1, wherein the mechanical retention member comprises means for centering a longitudinal axis of the mechanical retention member passing through the laminated glazing elements along an axis of the through-hole.

9. The assembly device as claimed in claim 8, wherein the mechanical retention member is centered fixedly along the axis of a hole in an individual glazing element of the first of the laminated glazing elements, and comprises means for compensating for off-center positioning of the axis of a hole in an individual glazing element of the second of the laminated glazing elements outside the axis of the hole in the individual glazing element of the first of the laminated glazing elements.

10. The assembly device as claimed in claim 9, wherein the mechanical retention member comprises:
at least one sleeve configured to be inserted in the through-hole,
a centering ring surrounding the sleeve and configured to be adjusted in the hole in the individual glazing element of the first of the laminated glazing elements with the centering ring in circumferential alignment with an external diameter of the sleeve and a diameter of the hole in the individual glazing element of the first of the laminated glazing elements, and
eccentric rings configured to rotate relative to one another and configured to be adjusted in the hole in the individual glazing element of the second of the laminated glazing elements, with one of the eccentric rings in circumferential alignment with the external diameter of the sleeve and another one of the eccentric rings in circumferential alignment with a diameter of the hole in the individual glazing element of the second of the laminated glazing elements.

11. The assembly device as claimed in claim 1, wherein the mechanical retention member comprises end washers to mask the through-hole on an outside of the assembly device.

12. The assembly device as claimed in claim 10, wherein the mechanical retention member comprises end washers to mask the through-hole on an outside of the assembly device, and wherein the end washers are tightened to the sleeve, and the sleeve is immobilized along a longitudinal axis of the sleeve in the through-hole after tightening the end washers.

13. The assembly device as claimed in claim 11, wherein shims are positioned between the end washers and outside panel surfaces of the laminated glazing elements.

14. The assembly device as claimed in claim 1, wherein, after installation of the mechanical retention member in the through-hole, remaining hollow spaces in the through-hole are filled with a mass of filler.

15. The assembly device as claimed in claim 14, wherein the mechanical retention member comprises end washers to mask the through-hole on an outside of the assembly device, and wherein the end washers comprise orifices for insertion of the mass of filler.

16. The assembly device as claimed in claim 15, wherein the end washers further comprise orifices for the discharge of air displaced by the inserted mass of filler.

17. The assembly device as claimed in claim 1, wherein at least the individual glazing elements extending into the overlap region are made of partially prestressed or prestressed glass.

18. A construction module, comprising the at least two laminated glazing elements assembled to one another by the assembly device as claimed in claim 1.

19. The assembly device as claimed in claim 1, wherein the two laminated glazing elements are assembled to one another in the overlap region so that outside panel surfaces of the laminated glazing elements are in axial alignment.

20. The assembly device as claimed in claim 1, wherein each of the laminated glazing elements comprise at least four of the individual glazing elements including at least two individual glazing elements that project into the overlap region and at least two individual glazing elements that are recessed from the overlap region.

21. The assembly device as claimed in claim 20, wherein the at least two individual glazing elements of the first of the two laminated glazing elements that project into the overlap region are contiguous with the at least two individual glazing elements of the second of the two laminated glazing elements that are recessed from the overlap region.

* * * * *